(12) United States Patent
Jinn et al.

(10) Patent No.: US 11,061,842 B2
(45) Date of Patent: *Jul. 13, 2021

(54) CONTEXT-AWARE DYNAMIC COMMAND SCHEDULING FOR A DATA STORAGE SYSTEM

(71) Applicant: Western Digital Technologies, Inc., San Jose, CA (US)

(72) Inventors: Scott Jinn, Diamond Bar, CA (US); Yun-Tzuo Lai, Irvine, CA (US); Haining Liu, Irvine, CA (US); Yuriy Pavlenko, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/827,591

(22) Filed: Mar. 23, 2020

(65) Prior Publication Data
US 2020/0218679 A1 Jul. 9, 2020

Related U.S. Application Data

(63) Continuation of application No. 15/600,672, filed on May 19, 2017, now Pat. No. 10,635,617.

(51) Int. Cl.
*G06F 13/374* (2006.01)
*G06F 13/26* (2006.01)
(Continued)

(52) U.S. Cl.
CPC ............ *G06F 13/374* (2013.01); *G06F 13/26* (2013.01); *H04W 28/08* (2013.01); *G06F 9/4843* (2013.01);
(Continued)

(58) Field of Classification Search
CPC ...... G06F 13/374; G06F 13/26; G06F 9/4843; G06F 9/4881; G06F 2209/484; H04W 28/08; H04W 74/002; H04W 74/0875
See application file for complete search history.

(56) References Cited

U.S. PATENT DOCUMENTS 7,933,283 B1 4/2011 Liu
8,707,104 B1 4/2014 Jean
(Continued)

*Primary Examiner* — Tim T Vo
*Assistant Examiner* — Harry Z Wang
(74) *Attorney, Agent, or Firm* — Morgan, Lewis & Bockius LLP

(57) ABSTRACT

The subject technology provides for managing a data storage system. Commands are identified into as a first command type or a second command type. The commands identified as the first command type are assigned to a first queue, and the commands identified as the second command type are assigned to a second queue. After the commands from the first queue and the commands from the second queue are processed based on a scheduling ratio over a predetermined period of time, a write amplification factor, number of host read commands, and number of host write commands during the predetermined period of time are determined. The scheduling ratio is updated based on the write amplification, the number of host read commands, the number of host write commands, and a predetermined scheduling ratio factor. Subsequent commands are processed from the first queue and the second queue based on the updated scheduling ratio.

17 Claims, 4 Drawing Sheets

(51) Int. Cl.
  *H04W 28/08* (2009.01)
  *G06F 9/48* (2006.01)
  *G06F 9/50* (2006.01)
  *H04W 74/00* (2009.01)
  *H04W 74/08* (2009.01)

(52) U.S. Cl.
  CPC .......... *G06F 9/4881* (2013.01); *G06F 9/5038* (2013.01); *G06F 2209/484* (2013.01); *H04W 74/002* (2013.01); *H04W 74/0875* (2013.01)

(56) References Cited

U.S. PATENT DOCUMENTS

| | | | |
|---|---|---|---|
| 9,075,712 B2 | 7/2015 | Box et al. | |
| 9,378,136 B1 | 6/2016 | Martin | |
| 2010/0250785 A1* | 9/2010 | Shin | G06F 3/067 710/3 |
| 2013/0227111 A1* | 8/2013 | Wright | G06F 11/3495 709/223 |
| 2013/0290601 A1* | 10/2013 | Sablok | G06F 12/0246 711/103 |
| 2014/0156877 A1 | 6/2014 | Tylik | |
| 2015/0006762 A1* | 1/2015 | Lee | G06F 13/1673 710/5 |
| 2017/0123730 A1* | 5/2017 | Losh | G06F 3/067 |
| 2017/0242592 A1* | 8/2017 | Camp | G06F 3/0605 |

* cited by examiner

CONTEXT-AWARE DYNAMIC COMMAND SCHEDULING FOR A DATA STORAGE SYSTEM

CROSS-REFERENCE TO RELATED APPLICATIONS

This application is a continuation of application Ser. No. 15/600,672, filed on May 19, 2017, now U.S. Pat. No. 10,635,617, the entirety of which is incorporated herein by reference for all purposes.

BACKGROUND

The present disclosure relates generally to scheduling commands for a data storage system.

In data storage systems, such as solid state drives (SSD), commands are queued and processed in the order the commands are received. Waiting for a previous command to be processed may cause latency in the next command in the queue. Latency may be more crucial for certain types of commands, for example host read commands, than other types of commands. For example, read latency of host read commands may negatively impact drive performance of data storage systems.

SUMMARY

Aspects of the subject technology relate to a method for managing a data storage system. The method may include identifying commands as a first command type or a second command type The method may also include assigning commands identified as the first command type to a first queue and commands identified as the second command type to a second queue, and processing commands from the first queue and commands from the second queue based on a scheduling ratio. The method may further include after the commands from the first queue and the commands from the second queue are processed based on the scheduling ratio over a predetermined period of time, determining a write amplification factor of the data storage system, a number of host read commands and a number of host write commands received from a host device during the predetermined period of time, wherein the first command type includes the host read commands and the second command type includes the host write command. The method may also include updating the scheduling ratio based on the determined write amplification, the number of host read commands, the number of host write commands, and a predetermined scheduling ratio factor, and processing subsequent commands from the first queue and the second queue based on the updated scheduling ratio.

In certain aspects, the subject technology also relates to a data storage system is provided. The data storage system may include means for identifying commands as a first command type or a second command type. The data storage system may also include means for assigning commands identified as the first command type to a first queue and commands identified as the second command type to a second queue. The data storage system may also include means for processing commands from the first queue and commands from the second queue based on a scheduling ratio. The data storage system may further include means for determining a write amplification factor of the data storage system, a number of host read commands and a number of host write commands received from a host device during the predetermined period of time, wherein the first command type includes the host read commands and the second command type includes the host write command after the commands from the first queue and the commands from the second queue are processed based on the scheduling ratio over a predetermined period of time. The data storage system may further include means for updating the scheduling ratio based on the determined write amplification, the number of host read commands, the number of host write commands, and a predetermined scheduling ratio factor. The data storage system may also include means for processing subsequent commands from the first queue and the second queue based on the updated scheduling ratio.

Aspects of the subject technology also relate to a data storage system including a plurality of storage devices, each storage device comprising a plurality of non-volatile memory die, and a controller coupled to the plurality of storage devices. The controller may be configured to identify commands as a first command type or a second command type. The controller may also be configured to assign commands identified as the first command type to a first queue and commands identified as the second command type to a second queue. The controller may further be configured to process commands from the first queue and commands from the second queue based on a scheduling ratio. The controller may be configured to determine a write amplification factor of the data storage system, a number of host read commands and a number of host write commands received from a host device during the predetermined period of time, wherein the first command type includes the host read commands and the second command type includes the host write command after the commands from the first queue and the commands from the second queue are processed based on the scheduling ratio over a predetermined period of time. The controller may also be configured to update the scheduling ratio based on the determined write amplification, the number of host read commands, the number of host write commands, and a predetermined scheduling ratio factor. The controller may further be configured to process subsequent commands from the first queue and the second queue based on the updated scheduling ratio.

It is understood that other configurations of the present disclosure will become readily apparent to those skilled in the art from the following detailed description, wherein various configurations of the present disclosure are shown and described by way of illustration. As will be realized, the present disclosure is capable of other and different configurations and its several details are capable of modification in various other respects, all without departing from the scope of the present disclosure. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details. In some instances, structures and components are shown in block diagram form in order to avoid obscuring the concepts of the subject technology. Like components are labeled with identical element numbers for ease of understanding.

Controllers manage data storage devices, such as solid state drives (SSD), and perform data operations on non-volatile memory, such as NAND flash memory, of the data storage devices. Controllers may receive operation commands (e.g., host read commands, host write commands) from host devices. Certain operation commands (e.g., erase commands, write commands, read commands, error correction, etc.) may be internally generated by data storage device firmware. The operation commands may be queued in the order received and/or generated for execution. Data operations of the operation commands may be performed in the queued order. However, operation commands earlier in the queue may increase latency of operation commands later in the queue. The subject technology may improve performance of data storage systems, for example, by queueing operation commands into multiple queues based on types of the operation commands and scheduling operation commands from respective queues based on a scheduling ratio. The scheduling ratio may be dynamically updated based on a number of operation commands received and/or generated according to the processes described herein.

Figure 1:
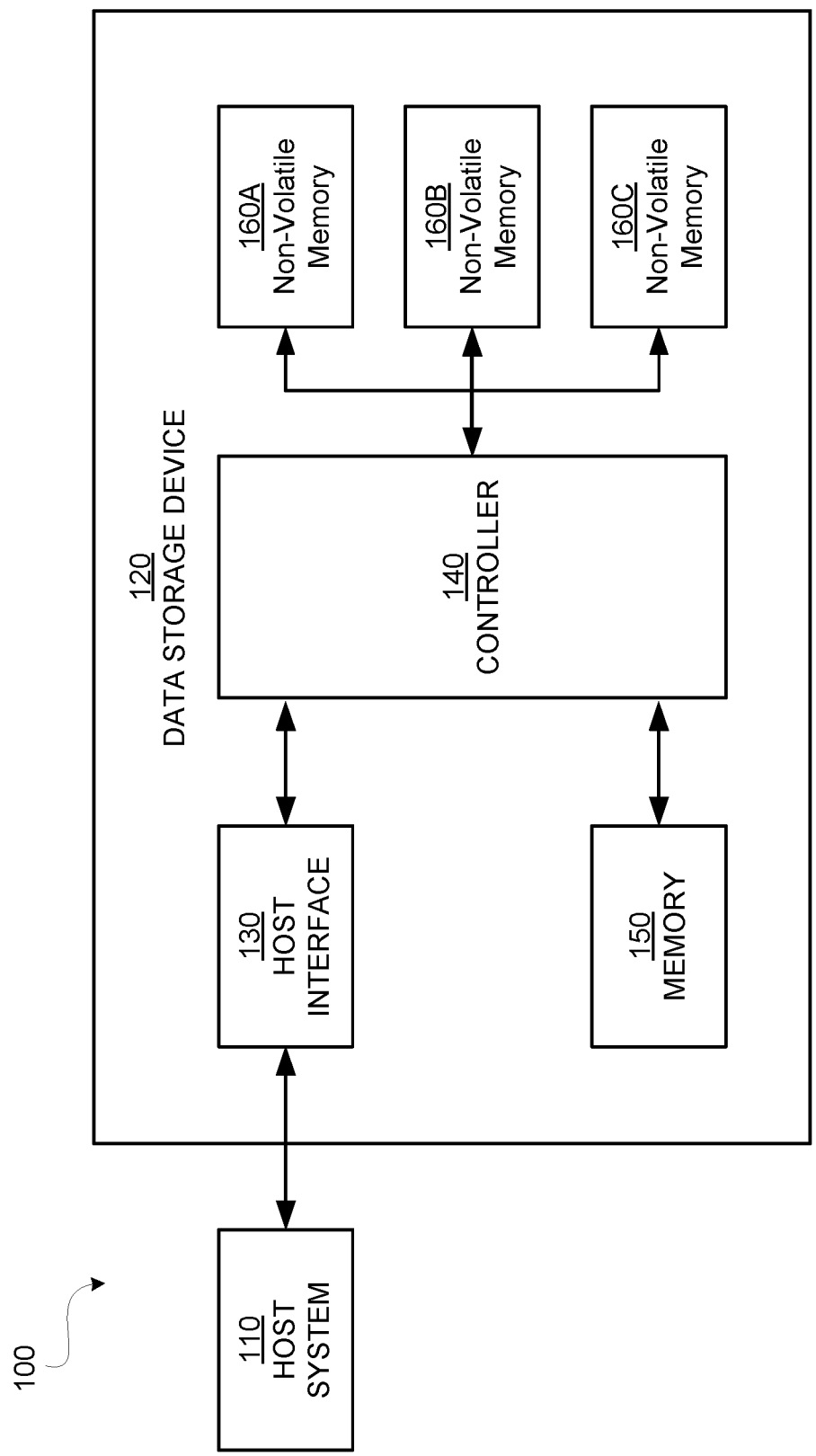
FIG. 1 is a block diagram depicting components of a data storage system according to aspects of the subject technology.

FIG. 1 is a block diagram depicting components of an example data storage system 100 according to various implementations of the subject technology. Data storage system 100 may include host system 110 and data storage device 120. Data storage device 120 (for example, a solid state drive) may include host interface 130, controller 140, memory 150, and non-volatile memory 160A-160C.

Host system 110 represents a device configured to be coupled to data storage system 120, to send data to and receive data from data storage system 120 via host interface 130. Host system 110 may be a computing system such as a personal computer, a server, a workstation, a laptop computer, PDA, smart phone, and the like. Alternatively, host system 110 may be an electronic device such as a digital camera, a digital audio player, a digital video recorder, and the like.

Host interface 130 may include both electrical and physical connections for operably coupling host system 110 to controller 140. Host interface 130 may be configured to communicate data, addresses, and control signals between host system 110 and controller 140. Host interface 130 may use any proprietary or standard interface protocols including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), Universal Flash Storage (UFS), and Peripheral Component Interconnect Express (PCIe).

According to aspects of the subject technology, host interface 130 may implement a wireless connection between host system 110 and data storage device 120 using standardized or proprietary wireless interface standards and protocols. In this regard, host interface 130 or other components of data storage device 120 may include a wireless transceiver to place host system 110 and data storage device 120 in wireless communication with each other.

Controller 140 is configured to store data received from host system 110 in non-volatile memory 160A-160C in response to a write command from host system 110, and to read data stored in non-volatile memory 160A-160C and to transfer the read data to host system 110 via host interface 130 in response to a read command from host system 110. Controller 140 may include several internal components (not shown in FIG. 1) such as multiple processor cores, memory, a flash component interface (for example, a multiplexer to manage instruction and data transport along a connection to non-volatile memory 160A-160C), an I/O interface, error correction code (ECC) module, and the like. The ECC module may be configured to generate code words to be stored in non-volatile memory 160A-160C from data received from host system 110 and to decode code words read from non-volatile memory 160A-160C before sending the decoded data to the host system 110. Various ECC solutions may be used to encode and decode data to generate the code words. In some aspects, one or more elements of controller 140 may be integrated into a single chip. In other aspects, the elements may be implemented on multiple discrete components.

Controller 140 may include a multi-core processor. For example, respective cores in the multi-core processor may be assigned to separate process. Controller 140, for example, may be configured to execute code or instructions to manage operation command flow and address mappings and to perform calculations and generate operation commands. The controller 140 may be configured to monitor and control the operation of the components in the data storage device 120. Controller 140 may include a general-purpose microprocessor, a microcontroller, a digital signal processor (DSP), an application specific integrated circuit (ASIC), a field programmable gate array (FPGA), a programmable logic device (PLD), a state machine, gated logic, discrete hardware components, or a combination of the foregoing.

Sequences of instructions may be stored as firmware in memory within controller 140. Sequences of instructions also may be stored and read from memory 150, non-volatile memory 160A-160C, or received from host system 110 (for example, via a host interface 130). Memory 150 and non-volatile memory 160A-160C represent examples of machine or computer readable media on which instructions/code executable by controller 140 may be stored. Machine or computer readable media may generally refer to any tangible and non-transitory media used to provide instructions to controller 140, its processor, including both volatile media, such as dynamic memory used for memory 150 or for buffers within controller 140, and non-volatile media, such as electronic media, optical media, and magnetic media.

Controller 140 may use memory 150 for temporary storage of data and information used to manage data storage device 120. In some aspects, memory 150 represents volatile memory used to temporarily store data and information used to manage data storage device 120. According to aspects of the subject technology, memory 150 may be random access memory (RAM) such as double data rate (DDR) RAM. Other types of RAM also may be used to implement memory 150. Memory 150 may be implemented using a single RAM module or multiple RAM modules. While memory 150 is depicted as being distinct from controller 140, memory 150 may be incorporated into controller 140 without departing from the scope of the present disclosure. Alternatively, memory 150 may be a non-volatile memory such as a magnetic disk, flash memory, and the like.

Non-volatile memory 160A-160C represent non-volatile memory devices for storing data. The number of non-volatile memory in data storage device 120 may be any number such as two, four, eight, sixteen, etc. For simplicity of discussion, non-volatile memory 160A-160C are depicted in FIG. 1. Non-volatile memory 160A-160C are not limited to any particular capacity or configuration. Each of non-volatile memory 160A-160C may be organized into blocks and pages. Each of blocks may include a number of pages, for example 256, and each of pages may contain one or more sectors or portions of data.

According to aspects of the subject technology, non-volatile memory 160A-160C include, for example, NAND flash memory. Non-volatile memory 160A-160C may comprise multilevel cell (MLC) flash memory and/or three-level cell (TLC) memory. In some aspects non-volatile memory 160A-160C may further comprise three-dimensional (3D) flash memory. In some aspects, non-volatile memory 160A-160C may comprise one or more hybrid memory devices that can function in one or more of a SLC, MLC, or TLC mode. The subject technology is not limited to these types of memory and may be applied to flash memory cells configured and operated using more than three levels (e.g., 4 bits per cell, 5 bits per cell, etc.).

Figure 2:
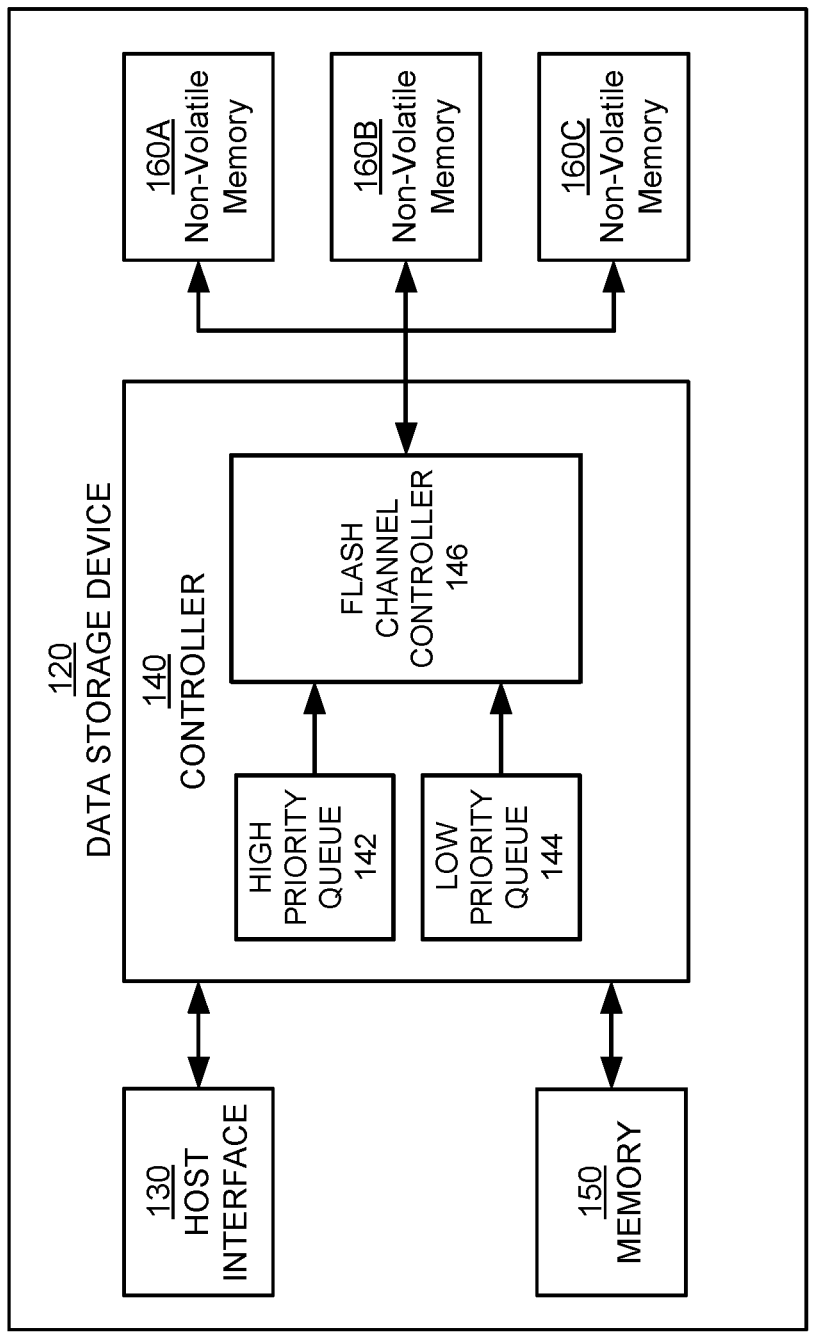
FIG. 2 is a block diagram depicting example command queues in a controller of a data storage device according to aspects of the subject technology.

FIG. 2 is a block diagram depicting example command queues of controller 140 of data storage device 120 according to aspects of the subject technology. Controller 140 includes high priority queue 142, low priority queue 144, and flash channel controller 146. Controller 140 may receive via host interface 130 host operation commands from host system 110. Host operation commands may include host read commands to read data from non-volatile memory 160A-160C. In some instances, host commands may also include host write commands to write data to non-volatile memory 160A-160C. In some aspects, controller 140 may generate internal operation commands. Internal operation commands may include internal program commands, internal erase commands, internal read commands, and error correction commands. For example, internal operation commands may be generated based on garbage collection (GC), background media scan (BGMS), or set/get features.

Controller 140 may identify operation commands (e.g., host operation commands and internal operation commands) as either high priority commands or low priority commands. For example, each type of operation command may be categorized as either a low priority command or a high priority command. Controller 140 may identify operation commands as either high priority commands or low priority commands based on a category list or other type of look-up data structure to prioritize the operation commands so that those operation commands that impact the drive performance of the data storage device may be processed with reduced wait times. For example, host read commands may be identified as high priority commands. In some instances, internal error correction commands to move data from data locations due to error count or operation failure may be identified as high priority commands. In some aspects, operation commands, such as host write commands, internal program commands, internal erase commands, and internal read commands, may be identified as low priority commands.

Operation commands identified as high priority commands are assigned to high priority queue 142, and operation commands identified as low priority commands are assigned to low priority queue 144. In some aspects, operation commands in respective queues in controller 140 may be queued in chronological order based on the time when operation commands were received by controller 140.

Controller 140 may schedule operation commands from high priority queue 142 and low priority queue 144 based on a scheduling ratio. A scheduling ratio may define, for example, a number of operation commands from high priority queue processed for every predetermined number of operation commands from low priority queue processed. For instance, controller 140 may schedule nine operation commands from the high priority queue for every one operation command from the low priority queue.

An initial scheduling ratio may be determined based on an average read latency of host read commands. For example, an initial scheduling ratio may be determined by processing test operation commands based on an arbitrary scheduling ratio and monitoring the average read latency of host read commands during the processing. The arbitrary scheduling ratio may be adjusted and tested until a scheduling ratio that results in an optimal or target average read latency of host read commands is determined. The scheduling ratio that results in the target average read latency may be set as an initial scheduling ratio. In some aspects, in addition to the average read latency of host read commands, an initial scheduling ratio may be determined for different levels of over provisioning (e.g., 7%, 10%, etc.) in data storage device 120.

Flash channel controller 146 may process operation commands from high priority queue and low priority queue based on the initial scheduling ratio. Flash channel controller 146 may process an operation command by issuing a command that corresponds to the operation command to non-volatile memory 160A-160C. When flash channel controller 146 processes operation commands from high priority queue and low priority queue based on the initial scheduling ratio for a predetermined period of time (e.g., 10 seconds), controller 140 may update the scheduling ratio using Equation (1):

$$\frac{A}{B \cdot C} \cdot D = E \qquad \text{Equation (1)}$$

A: Number of host read commands
B: Number of host write commands
C: Write amplification factor
D: Scheduling ratio factor
E: Scheduling ratio Controller 140 may maintain a log of operation commands in memory 150. For example, the log may include types of operation commands and numbers of respective types of operation commands processed during the predetermined period of time. Number of host read commands A may be, for example, a number of host read command received from host system 110 during the predetermined period of time. Number of host write commands B is, for example, a number of host write commands received during the predetermined period of time based on the log.

Write amplification factor C represents the number of write operation performed for every host write command received from host system 110. The write amplification factor may correlate to a number of program/erase cycles of blocks in data storage device 120. The write amplification factor may increase as the number of program/erase cycles increase. For example, blocks of non-volatile memory 160A-160C are capable of tolerating a finite number of program/erase cycles before a block is taken out of circulation and becomes unavailable. Thus, as data storage device 120 approaches its end-of-life, the number of available blocks in non-volatile memory 160A-160C may decrease. When the number of available blocks decrease, controller 140 may be required to perform more data relocations and/or garbage collections to accommodate new host write commands. This may result in increase of the write amplification factor. In some aspects, a table that includes predefined write amplification factors associated with different stages of life of non-volatile memory 160A-160C may be stored in memory 150.

Scheduling ratio factor D may be determined based on the initial scheduling ratio E, the number of host read commands A, the number of host write command B, and the write amplification factor C using Equation (1).

The initial scheduling ratio is determined based on a certain mix of operation command types. However, the mix of operation command types may vary during operation of the data storage device from the certain mix of operation command types used to determine the initial scheduling ratio, and the average read latency resulting from the initial scheduling ratio may deviate from the optimal or target average read latency of host read commands. In order to maintain the optimal or target average read latency, controller 140 may update the scheduling ratio by determining a new scheduling ratio E using the determined scheduling ratio factor D. For example, controller 140 may determine a number of host write commands A and a number of host read commands B over a predetermined period of time. Controller 140 may also determine write amplification factor C using, for example, the table stored in memory 150. The scheduling ratio factor D may be read from memory 150. Using Equation (1), controller 140 determines a new scheduling ratio for updating the scheduling ratio. Controller 140 may update the initial scheduling ratio with the new scheduling ratio. Controller 140 schedules and processes subsequent operation commands received based on the updated scheduling ratio.

Figure 3A:
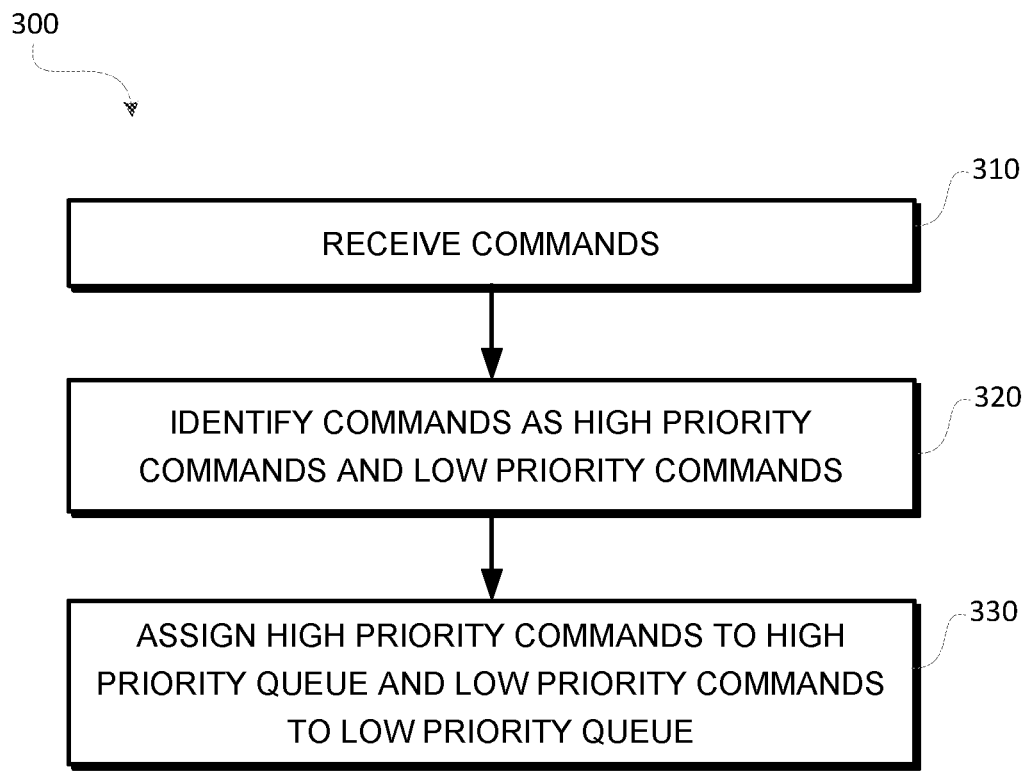
FIGS. 3A and 3B depict a flow diagram of an example process for managing a data storage system according to aspects of the subject technology.

FIG. 3A depicts a flow diagram of an example process for managing data storage system 120 according to aspects of the subject technology. For explanatory purposes, the various blocks of example process 300 are described herein with reference to the components and/or processes described herein. The one or more of the blocks of process 300 may be implemented, for example, by one or more processors, including, for example, controller 140 of FIG. 1 or one or more components or processors of controller 140. In some implementations, one or more of the blocks may be implemented apart from other blocks, and by one or more different processors or controllers. Further for explanatory purposes, the blocks of example process 300 are described as occurring in serial, or linearly. However, multiple blocks of example process 300 may occur in parallel. In addition, the blocks of example process 300 need not be performed in the order shown and/or one or more of the blocks of example process 300 need not be performed.

At block 310, controller 140 receives operation commands. For example, controller 140 receives host commands (i.e., host read commands and host write commands) from host system 110 via host interface 130. In some aspects, internal commands generated based on, for example, GC or BGMS may be included in the operation commands. At block 320, controller 140 identifies the operation commands as either high priority commands or low priority commands. For example, host read commands may be identified as high priority commands. In some aspects, error correction commands may be identified as high priority commands. Operation commands, such as host read commands, internal write commands, internal erase commands, and internal read commands, generated by controller 140 may be identified as low priority commands.

At block 330, controller 140 assigns operation commands to high priority queue 142 and low priority queue 144. For example, operation commands identified as high priority commands are assigned to high priority queue 142, and operation commands identified as low priority commands are assigned to low priority queue 144.

Figure 3B:
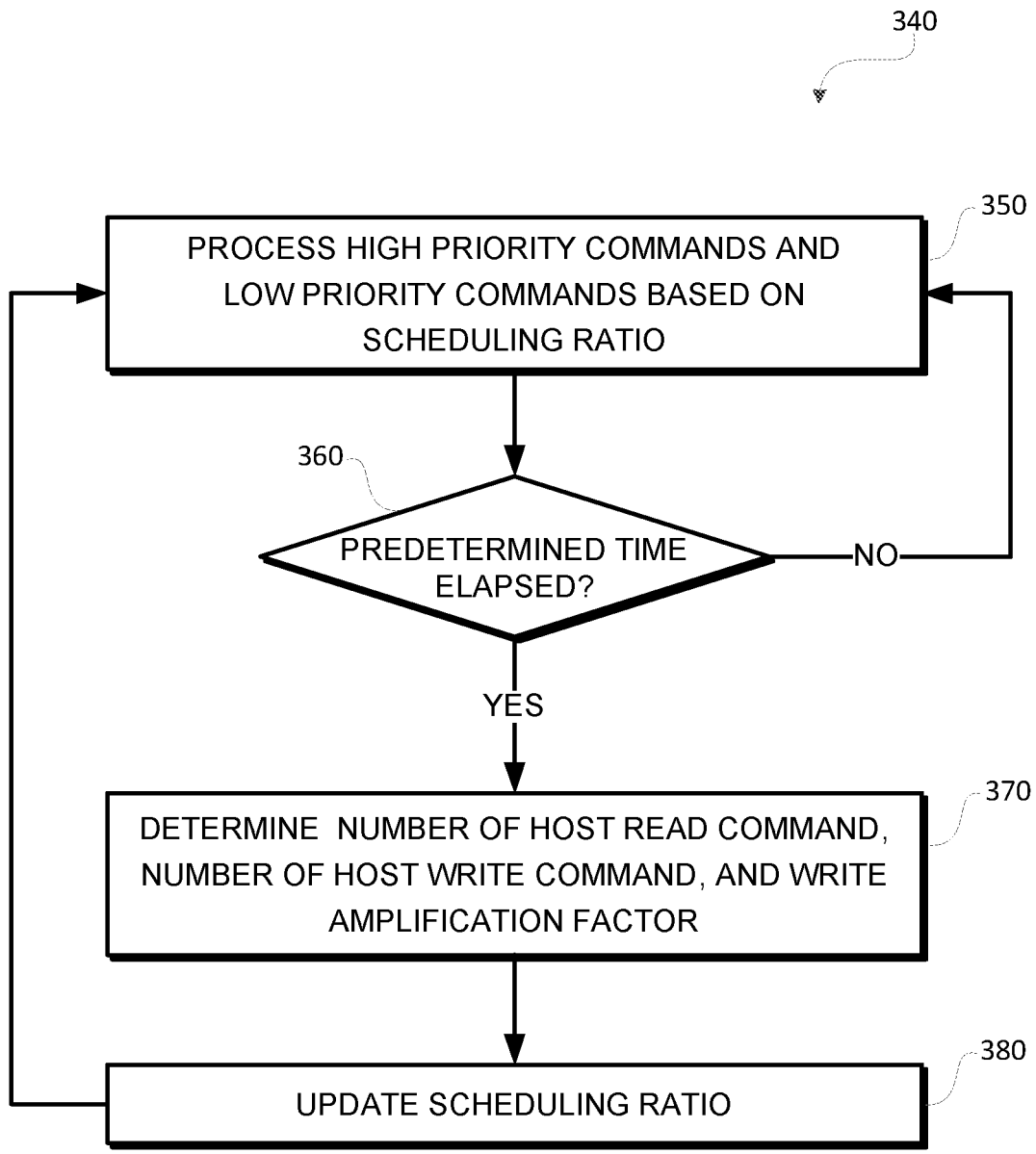

FIG. 3B depicts a flow diagram of an example process for managing data storage system 120 according to aspects of the subject technology. For explanatory purposes, the various blocks of example process 340 are described herein with reference to the components and/or processes described herein. The one or more of the blocks of process 340 may be implemented, for example, by one or more processors, including, for example, controller 140 of FIG. 1 or one or more components or processors of controller 140. In some implementations, one or more of the blocks may be implemented apart from other blocks, and by one or more different processors or controllers. Further for explanatory purposes, the blocks of example process 340 are described as occurring in serial, or linearly. However, multiple blocks of example process 340 may occur in parallel. In addition, the blocks of example process 340 need not be performed in the order shown and/or one or more of the blocks of example process 340 need not be performed.

At block 350, controller 140 processes the high priority commands from high priority queue 142 and the low priority commands from low priority queue 144 based on a scheduling ratio. For example, if the scheduling ratio indicates 9:1, flash channel controller 146 of controller 140 may consecutively process nine high priority commands from high priority queue 142. After flash channel controller 146 processes nine high priority commands from high priority queue 142, flash channel controller 146 may process one low priority command from low priority queue 144.

At block 360, whether a predetermined time has elapsed is determined. For example, when a predetermined time (e.g., 10 seconds) has elapsed after the processing of the high priority commands from high priority queue 142 and the low priority commands from low priority queue 144 has started, controller 140 determines that a predetermined time has elapsed (block 360=YES), and process 340 proceeds to block 370. Otherwise, when controller determines that a predetermined time has not elapsed (block 360=NO), process 340 returns to block 350.

At block 370, determines a number of host read commands, a number of host write commands, and a write amplification factor. For example, controller 140 may determine a number of host read commands and a number of host write commands received from host device 110 during the predetermined time. In some aspects, controller 140 may determine a write amplification factor based on a number of program/erase cycles of data storage device 120.

At block 380, controller 140 updates the scheduling ratio. Controller 140 determines a new scheduling ratio based on the determined number of host read commands, number of host write commands, and write amplification factor. For example, using Equation (1), controller 140 determines a new scheduling ratio by dividing the determined number of host read commands by the product of the determined number of host write and wire amplification factor. The result of the division is multiplied by a predetermined scheduling ratio factor. The result of calculation is the new scheduling ratio. Controller 140 updates the existing scheduling ratio with the new scheduling ratio. Process 340 returns to block 350. Subsequent operation commands are processed based on the updated scheduling ratio.

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

The phrases "in communication with" and "coupled" mean in direct communication with or in indirect communication with via one or more components named or unnamed herein (e.g., a memory card reader).

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an implementation may apply to all aspects, or one or more aspects. An implementation may provide one or more examples. A phrase such as an "embodiment" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method for managing a storage device, the method comprising:

allocating a high priority command to a high priority queue;

allocating a low priority command to a low priority queue; wherein the low priority queue is configured to contain two or more different command types;

executing commands from the high priority queue and the low priority queue based on a scheduling ratio, wherein the scheduling ratio indicates a ratio between a number of one or more commands from the high priority queue to be processed and a number of one or more commands from the low priority queue to be processed;

determining a write amplification factor of the storage device;

determining a number of read commands and a number of write commands received during a respective period of time; and executing additional commands from the high priority queue and the low priority queue based on an updated scheduling ratio, wherein the updated scheduling ratio increases as the number of read commands increases, wherein the updated scheduling ratio decreases as the number of write commands or the write amplification factor increases, and wherein the updated scheduling ratio is generated based on the following equation:

$$\frac{A}{B \cdot C} \cdot D = E$$

wherein:

A is the number of read commands received during the respective period of time,

B is the number of write commands received during the respective period of time, C is the write amplification factor, D is a scheduling ratio factor determined based on the scheduling ratio, A, B, and C, and E is the updated scheduling ratio.

2. The method of claim 1,
wherein the updated scheduling ratio decreases as the number of write commands increases, and
wherein the updated scheduling ratio decreases as the write amplification factor increases.

3. The method of claim 2,
wherein the scheduling ratio factor depends on the scheduling ratio, the number of read commands, the number of write commands, and the write amplification factor, and
wherein the updated scheduling ratio increases as the scheduling ratio factor increases.

4. The method of claim 1, wherein the two or more different command types include a write command and a command that is not the write command.

5. The method of claim 1, further comprising:
maintaining, in memory, a log of the number of read commands and the number of write commands received from a host device during the respective period of time.

6. The method of claim 1, wherein the write amplification factor of the storage device is determined based on a number of program/erase cycle performed on the storage device.

7. The method of claim 1, wherein the write amplification factor of the storage device is determined based on an amount of over provisioning of the storage device.

8. A storage device, comprising:
non-volatile memory; and
one or more controllers configured to cause:
allocating a high priority command to a high priority queue;
allocating a low priority command to a low priority queue; wherein the low priority queue is configured to contain two or more different command types;
executing commands from the high priority queue and the low priority queue based on a scheduling ratio, wherein the scheduling ratio indicates a ratio between a number of one or more commands from the high priority queue to be processed and a number of one or more commands from the low priority queue to be processed;
determining a write amplification factor of the storage device;
determining a number of read commands and a number of write commands received during a respective period of time; and
executing additional commands from the high priority queue and the low priority queue based on an updated scheduling ratio,
wherein the updated scheduling ratio increases as the number of read commands increases,
wherein the updated scheduling ratio decreases as the number of write commands or the write amplification factor increases, and
wherein the updated scheduling ratio is generated based on the following equation:

$$\frac{A}{B \cdot C} \cdot D = E$$

wherein:
A is the number of read commands received during the respective period of time,
B is the number of write commands received during the respective period of time,
C is the write amplification factor,
D is a scheduling ratio factor determined based on the scheduling ratio, A, B, and C, and
E is the updated scheduling ratio.

9. The storage device of claim 8,
wherein the updated scheduling ratio decreases as the number of write commands increases, and
wherein the updated scheduling ratio decreases as the write amplification factor increases.

10. The storage device of claim 9,
wherein the scheduling ratio factor depends on the scheduling ratio, the number of read commands, the number of write commands, and the write amplification factor, and
wherein the updated scheduling ratio increases as the scheduling ratio factor increases.

11. The storage device of claim 8, wherein the two or more different command types include a write command and a command that is not the write command.

12. The storage device of claim 8, further comprising:
maintaining, in memory, a log of the number of read commands and the number of write commands received from a host device during the respective period of time.

13. The storage device of claim 8, wherein the write amplification factor of the storage device is determined based on a number of program/erase cycle performed on the storage device.

14. The storage device of claim 8, wherein the write amplification factor of the storage device is determined based on an amount of over provisioning of the storage device.

15. An apparatus, comprising:
means for allocating a high priority command to a high priority queue;
means for allocating a low priority command to a low priority queue; wherein the low priority queue is configured to contain two or more different command types;
means for executing commands from the high priority queue and the low priority queue based on a scheduling ratio, wherein the scheduling ratio indicates a ratio between a number of one or more commands from the high priority queue to be processed and a number of one or more commands from the low priority queue to be processed;
means for determining a write amplification factor of the apparatus;
means for determining a number of read commands and a number of write commands received during a respective period of time;
means for executing additional commands from the high priority queue and the low priority queue based on an updated scheduling ratio; and
means for generating the updated scheduling ratio based on the following equation:

$$\frac{A}{B \cdot C} \cdot D = E$$

wherein:
A is the number of read commands received during the respective period of time,
B is the number of write commands received during the respective period of time, C is the write amplification factor, D is a scheduling ratio factor determined based on the scheduling ratio, A, B, and C, and E is the updated scheduling ratio, wherein the updated scheduling ratio increases as the number of read commands increases, and wherein the updated scheduling ratio decreases as the number of write commands or the write amplification factor increases.

16. The apparatus of claim 15, wherein the updated scheduling ratio decreases as the number of write commands increases, and wherein the updated scheduling ratio decreases as the write amplification factor increases.

17. The apparatus of claim 16, wherein the scheduling ratio factor depends on the scheduling ratio, the number of read commands, the number of write commands, and the write amplification factor, and wherein the updated scheduling ratio increases as the scheduling ratio factor increases.

\* \* \* \* \*